Feb. 13, 1962 F. SCHWARZBACH 3,020,799
PHOTOGRAPHIC ORTHO PROJECTOR
Filed Nov. 5, 1957 16 Sheets-Sheet 4
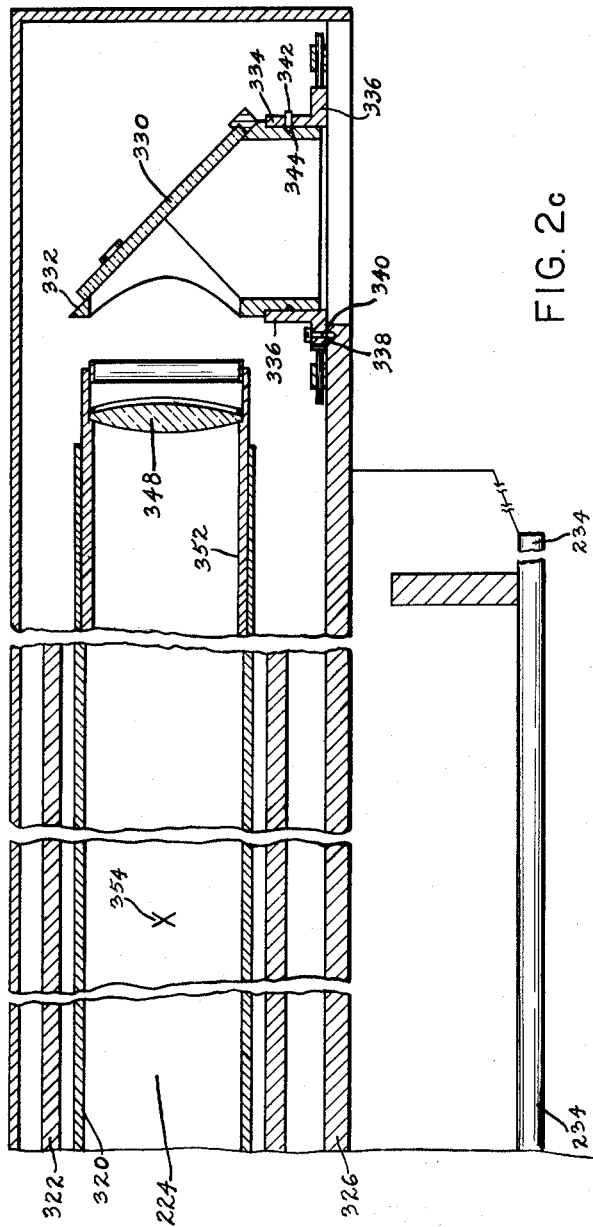
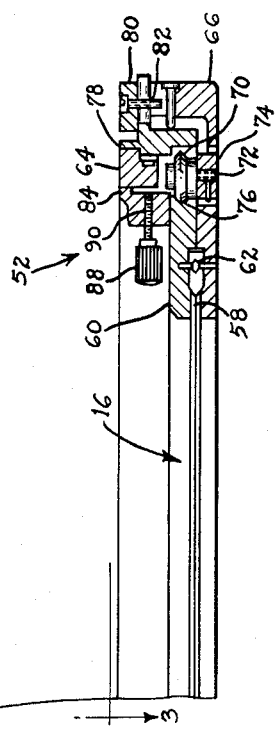
FIG. 2c
INVENTOR.
FREDERICK SCHWARZBACH
BY
*J. A. O'Donnell*
*Lawrence S. Epstein*
ATTORNEYS

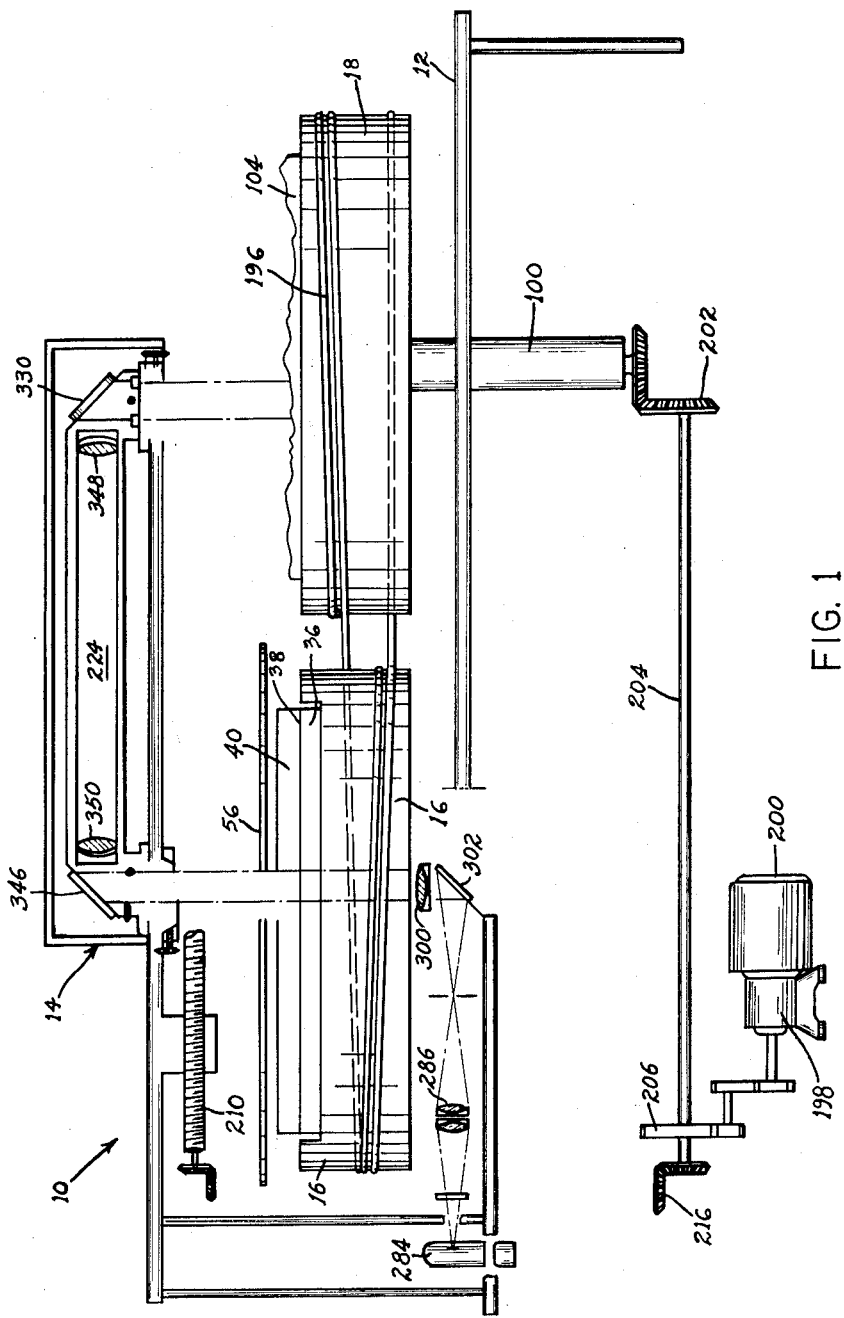

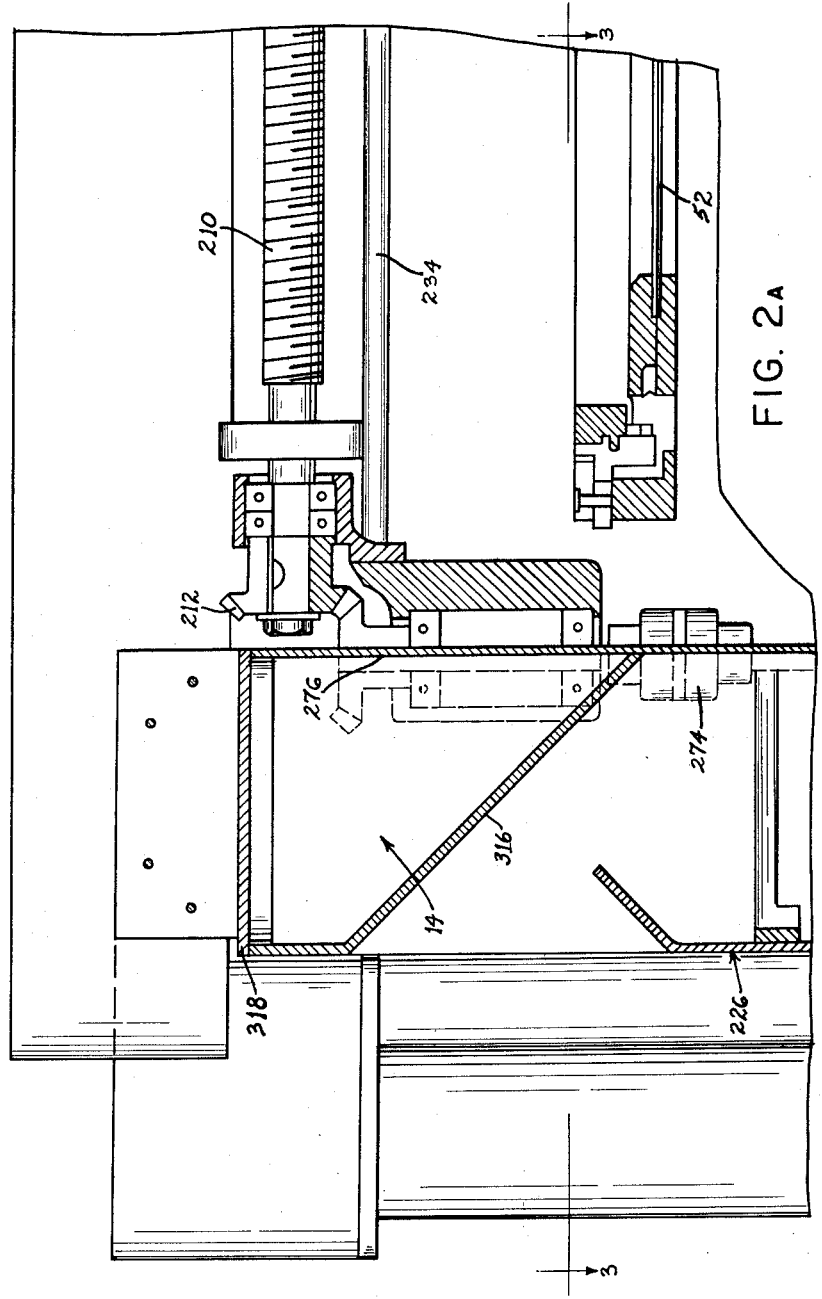

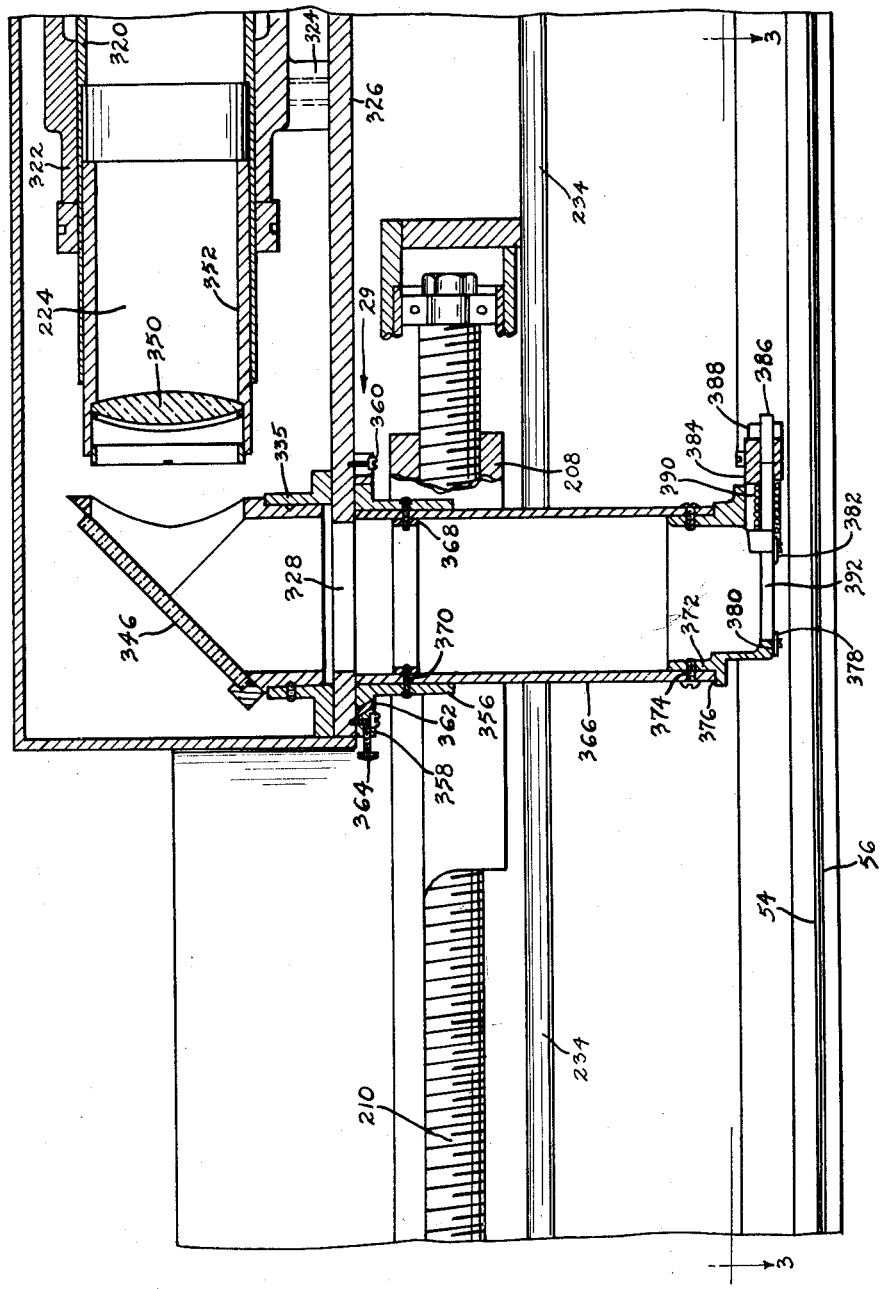

INVENTOR.
FREDERICK SCHWARZBACH

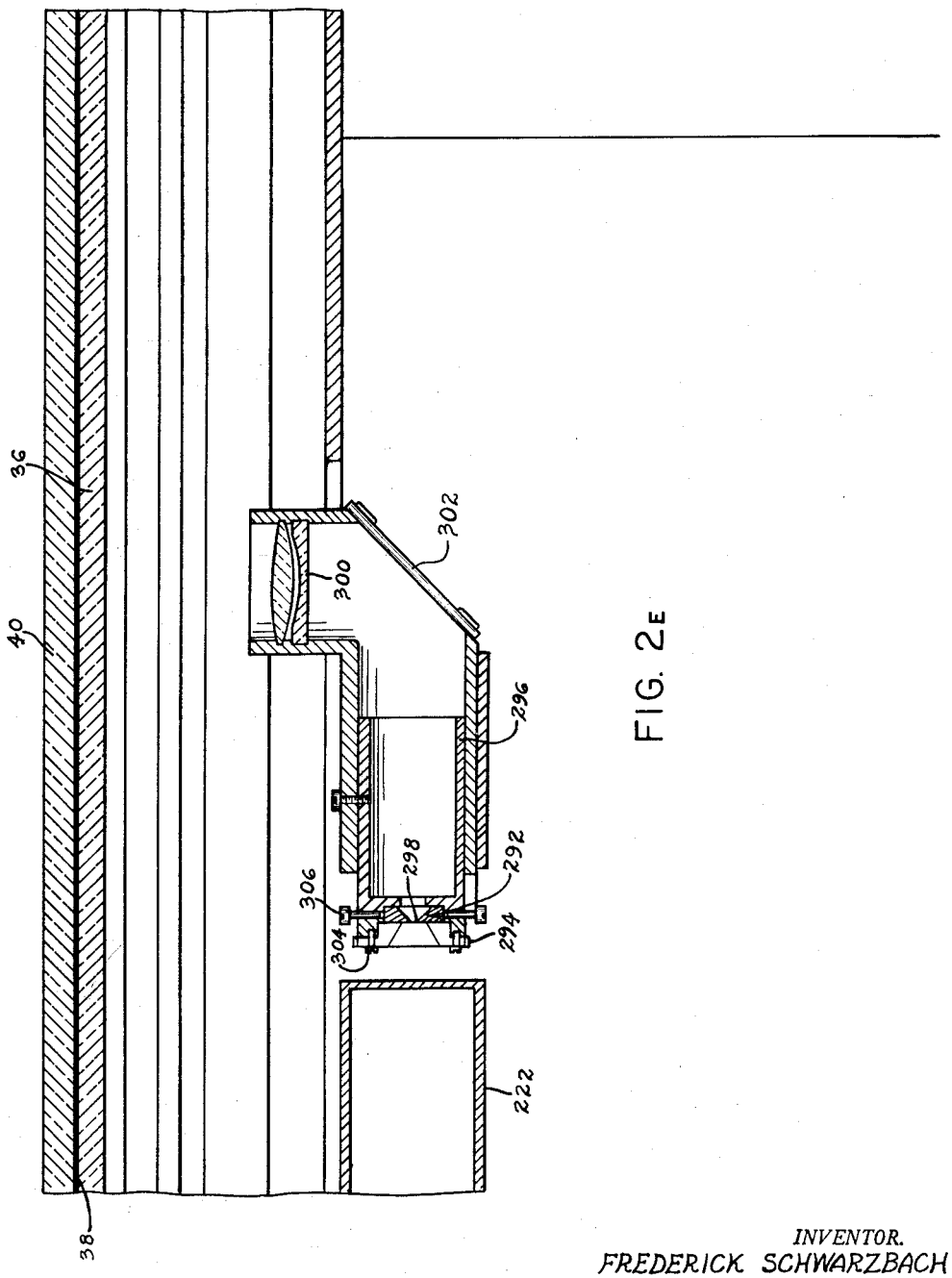

Feb. 13, 1962  F. SCHWARZBACH  3,020,799
PHOTOGRAPHIC ORTHO PROJECTOR
Filed Nov. 5, 1957  16 Sheets-Sheet 7

INVENTOR.
FREDERICK SCHWARZBACH
BY
ATTORNEYS

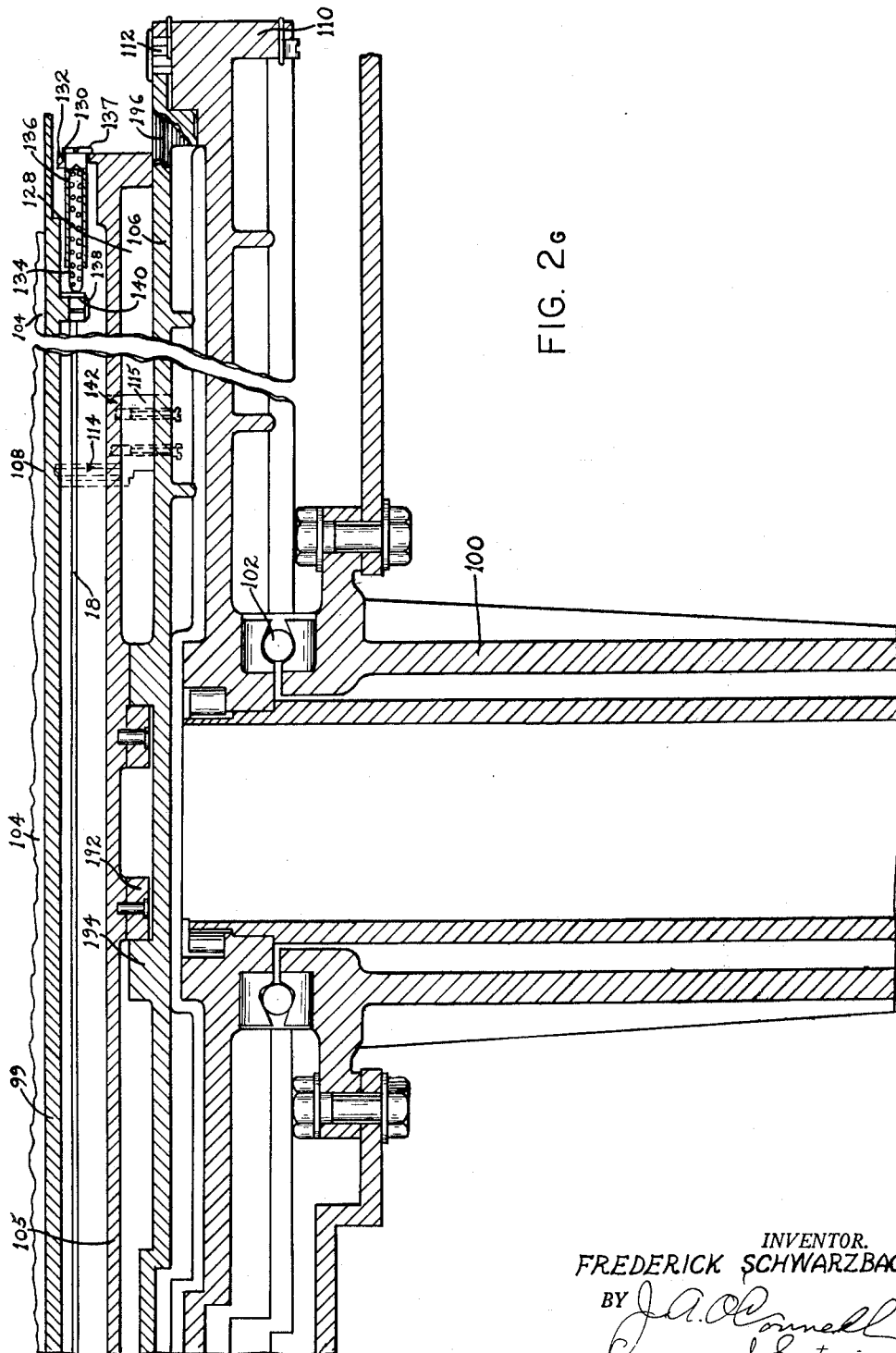

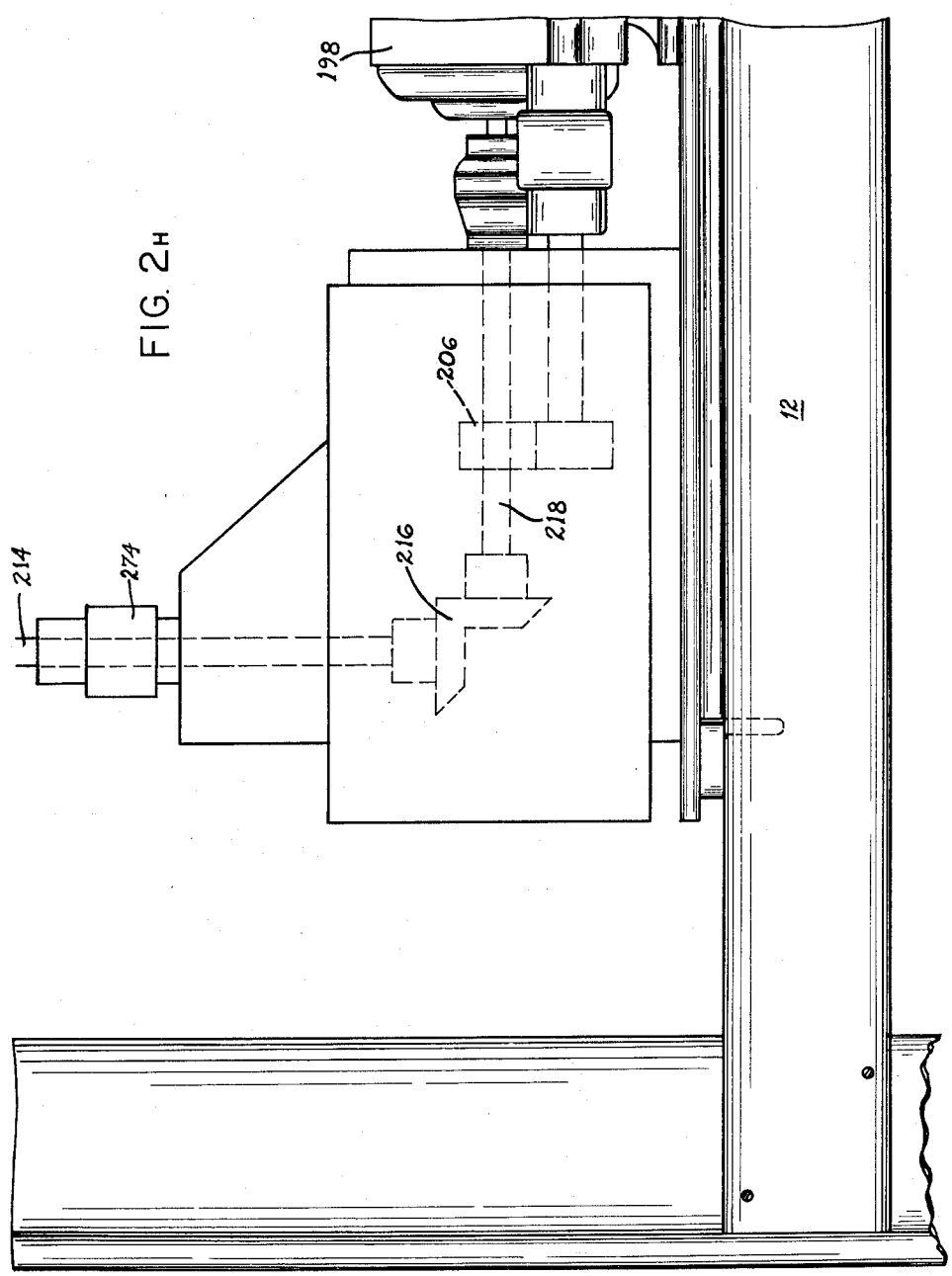

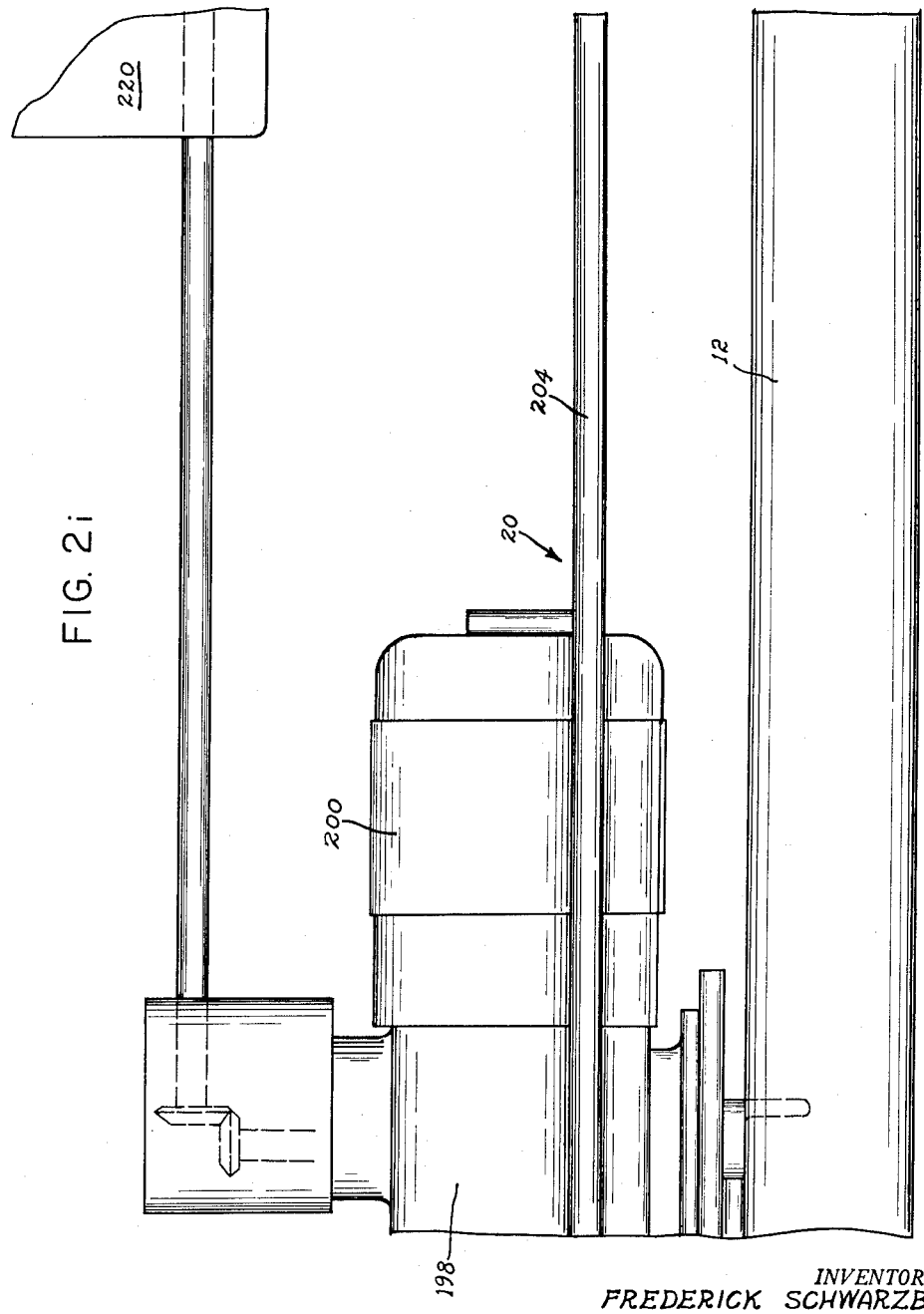

Feb. 13, 1962 F. SCHWARZBACH 3,020,799
PHOTOGRAPHIC ORTHO PROJECTOR
Filed Nov. 5, 1957 16 Sheets-Sheet 11
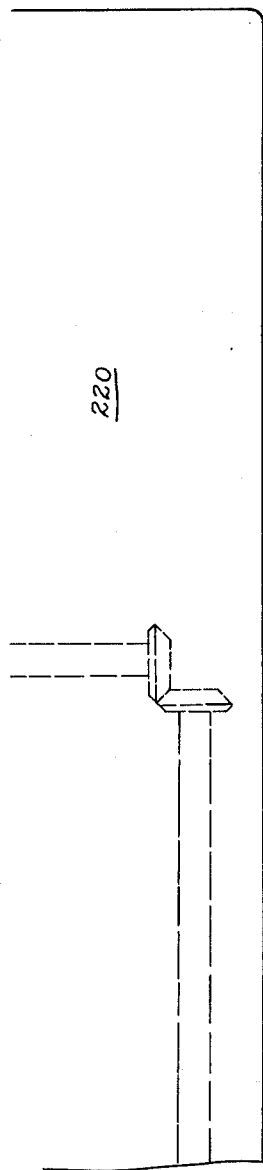
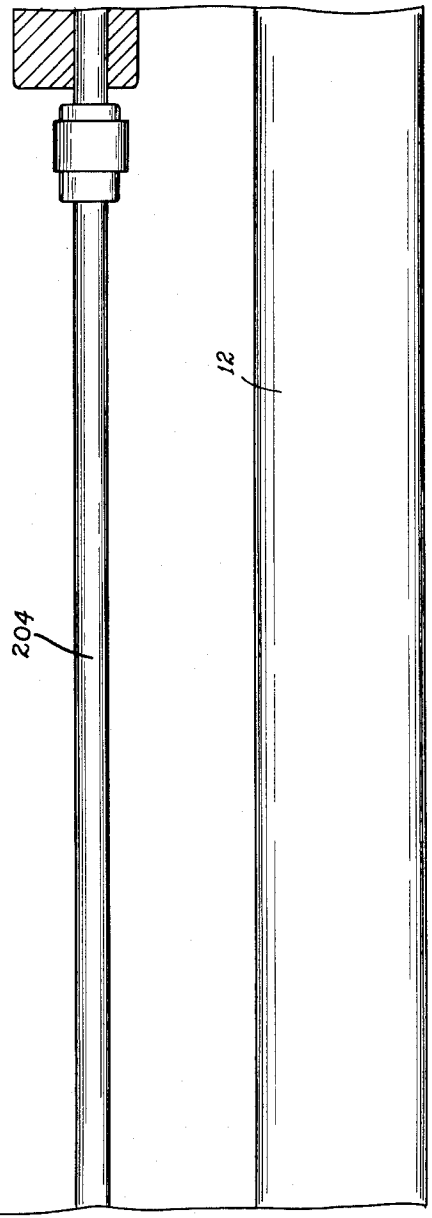
FIG. 2J
INVENTOR.
FREDERICK SCHWARZBACH
BY
Lawrence S. Epstein
ATTORNEYS Feb. 13, 1962   F. SCHWARZBACH   3,020,799
PHOTOGRAPHIC ORTHO PROJECTOR
Filed Nov. 5, 1957   16 Sheets-Sheet 12
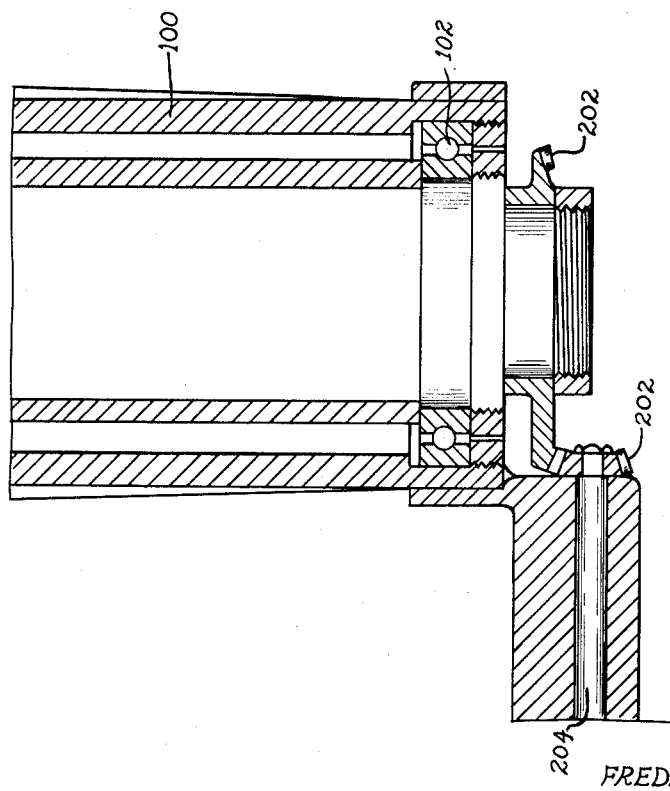
INVENTOR.
FREDERICK SCHWARZBACH
BY
ATTORNEYS

INVENTOR.
FREDERICK SCHWARZBACH

INVENTOR.
FREDERICK SCHWARZBACH

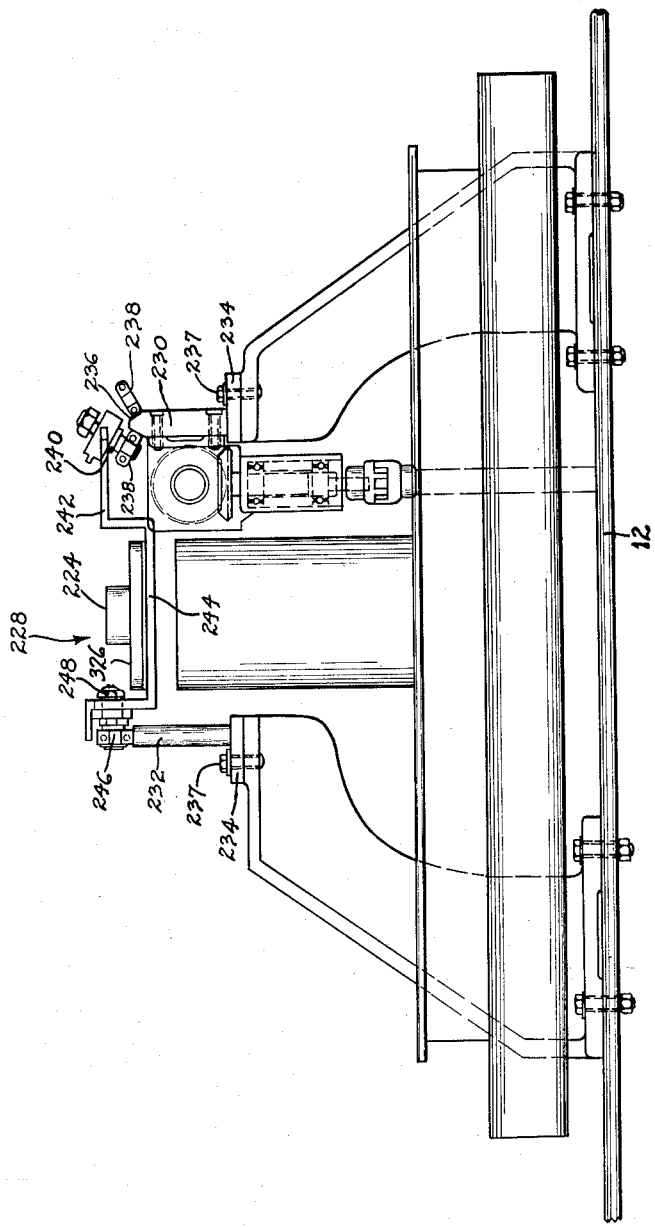

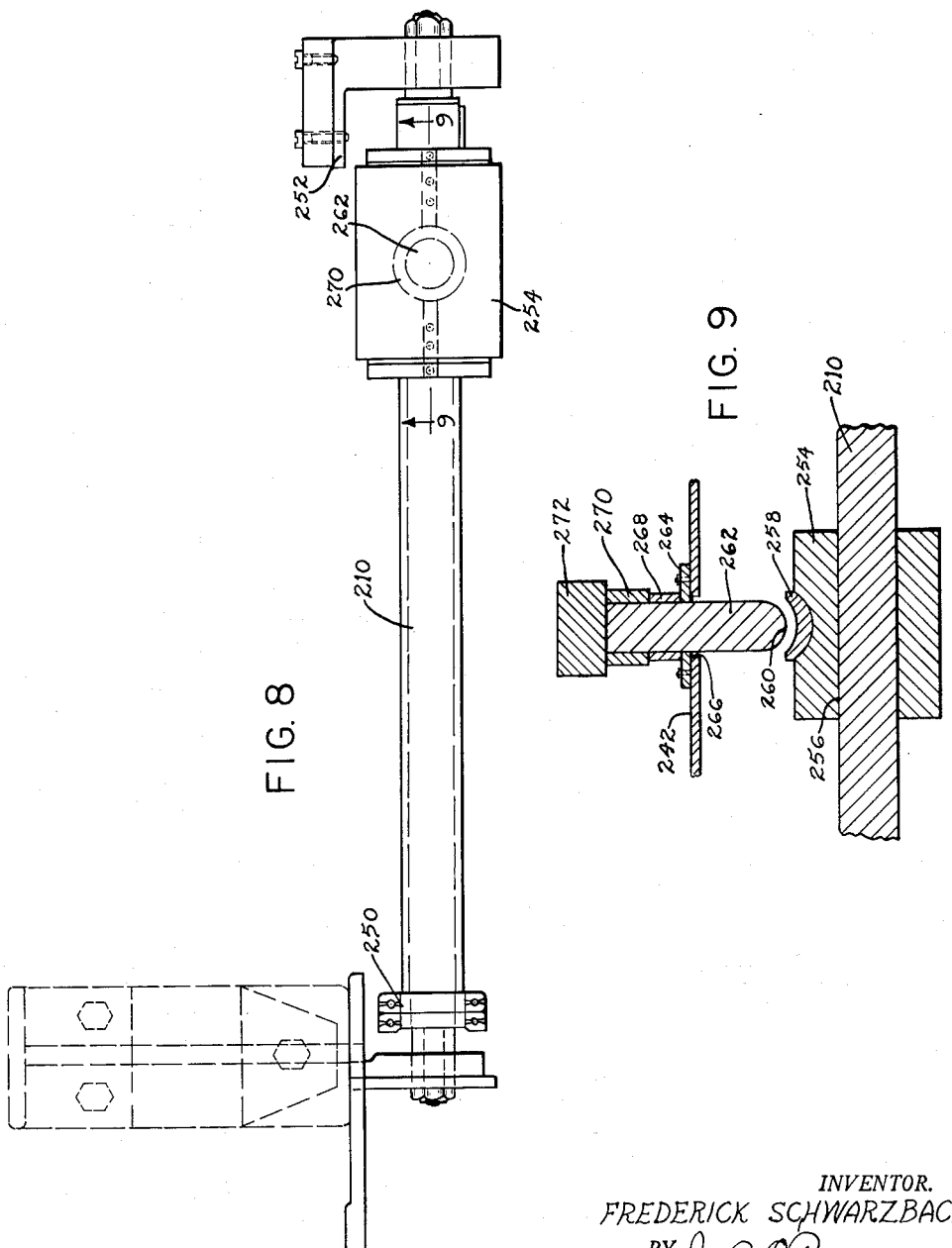

3,020,799
PHOTOGRAPHIC ORTHO PROJECTOR
Frederick Schwarzbach, Irondequoit, N.Y., assignor, by mesne assignments, to the United States of America as represented by the Secretary of the Navy
Filed Nov. 5, 1957, Ser. No. 694,690
8 Claims. (Cl. 88—24)

The invention relates to a photo ortho projector used in the field of photogrammetry and is designed to convert directly topographical information taken from a negative into a three dimenisonal relief model.

Transparent rectified aerial mosaic negatives, or orthoganol negatives, can be projected so that the image is formed on a three-dimensional photo-sensitized terrain model of sections of the earth's surface from which the aerial mosaic negative was made. The three-dimensional terrain model, after projection and processing by ordinary techniques, will then appear to an observer looking down upon it exactly the same as to an aviator flying at a specific height above the actual terrain.

The conversion of two-dimensional map information into a three dimensional terrain model by conventional methods is manual and as a result is tedious and time consuming. Attemps at automatically providing such three dimensional information have not been successful previously, since accurate transposition of the necessary data has not been adequate. However, by means of scanning a negative and making use of the optical principle of telecentric projection, an appreciable depth of focus is obtained without resorting to use of an extremely long focus lens. In addtiion, parallactic distortion is avoided.

The principal object of the invention is to convert automatically two dimensional map information into a three dimensional terrain model.

A further object of the invention is to prevent in such conversion, parallactic distortion due to the need for providing an appreciable depth of focus without employing long local lenses.

A feature of the invention resides in the scanning of the terrain negative to cover the large negative area. Another feature of the invention provides a light source that is located at the focal point of a collimating lens. Light thus passes through the negative in parallel lines and provides a great depth of focus.

Another feature of the invention resides in the use of a mask to remove the possibility of overlap or underlap, which would cause a spiral dark or bright line on the terrain print. Still another feature resides in the use of two discs, controlled for movement rotatively in opposite directions by means of two cables, so that one unwinds while the other winds.

Still another feature resides in mounting the complete optical system on a cradle that rolls on straight parallel tracks. These movements aid in adjusting equipment and registering the negative and terrain model.

Other objects and many of the attendant advantages of this invention will be readily appreciated as the same becomes better understood by reference to the following detailed description when considered in connection with the acocmpaning drawings wherein:

FIG. 1 is a schematic illustration of the optical and mechanical construction of the projector;

FIGS. 2a through 2k are a vertical section of the ortho projector, taken substantially on line 2—2 of FIG. 3, with some parts shown in elevation and with the optical system support omitted;

FIG. 7 is an end view of FIGS. 2a through 2k illustrating the optical assembly support in detail;

FIG. 8 is a detail of the rear screw structure; and

FIG. 9 is a section taken on line 9—9 of FIG. 8.

Figure 2D:
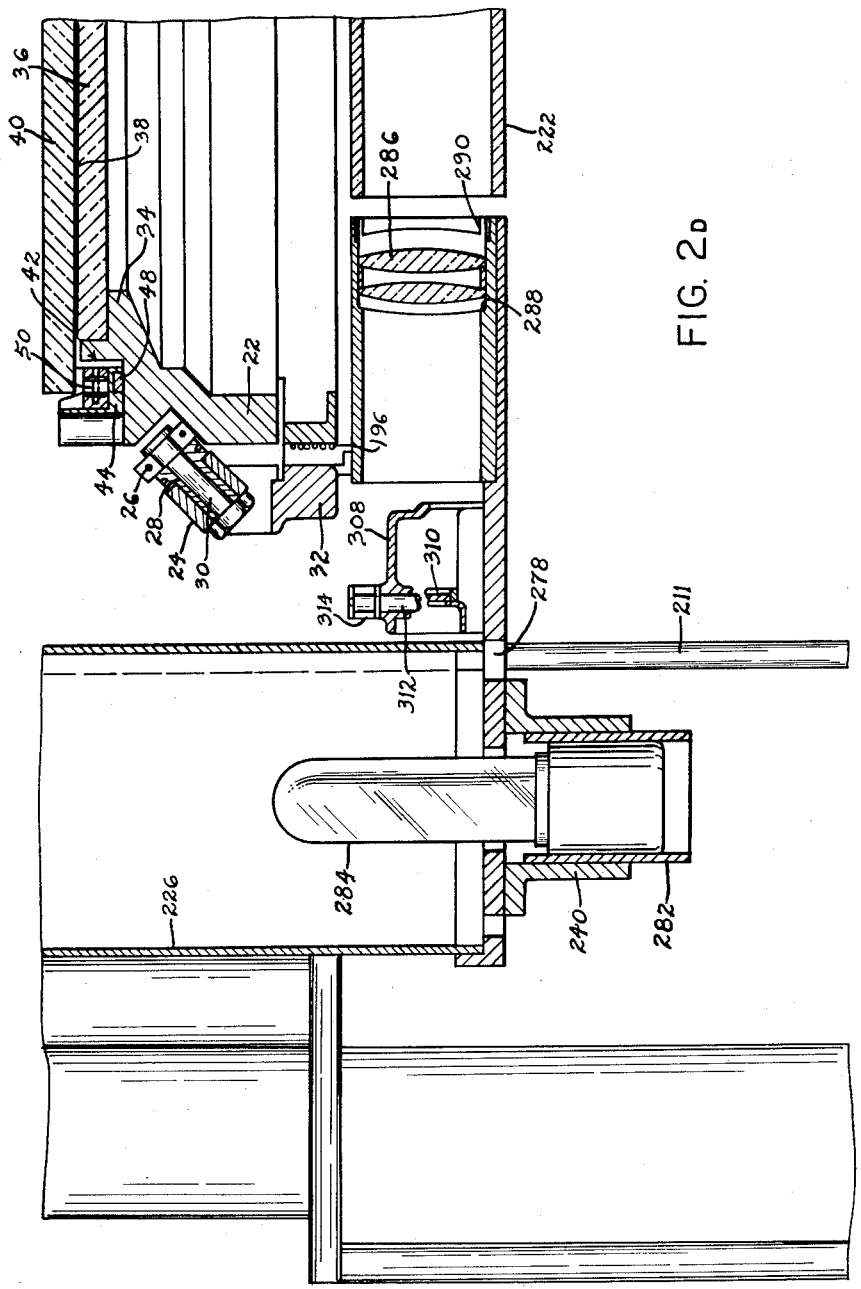

Referring to FIG. 1, a photo orthoprojector 10 is mounted on supporting frame 12, which may be a table or similar structure, capable of being moved so that the device is portable. Where desired the frame support is capable of disassembly and is also provided with means to insure a level position for the instrument.

Projector 10 comprises an optical system 14, a negative carrier 16, an easel disc turntable 18 and power operating means 20. Negatives, such as maps or drawings, having a diagonal limited only by the size of the projector, can be projected on easel turntable 18. The device is able to handle terrain models that vary in depth as much as two inches. Good reproductions of details equivalent to five lines per millimeter at one and one-half inches above sea level are obtained through the use of the orthoprojector.

Figure 2F:
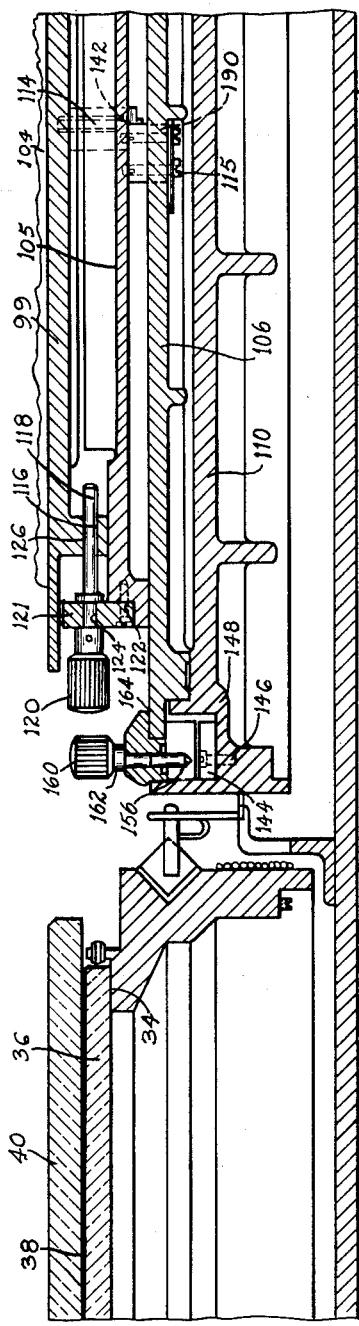

As shown on FIG. 2d–f, negative carrier 16 is rotatably supported on frame 12 and comprises a hollow cylindrical drum carrier 22, rotated by means of rollers 24 mounted around its outer edge. Each roller 24 includes races 26, bushing 28 and a ball bearing shaft 30. Rollers 24 are retained on bearing adapter ring 32, extending around the periphery of drum carrier 22.

Figure 4:
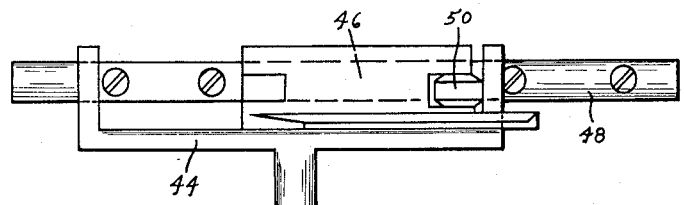
FIG. 4 is a detail of the device illustrating construction of the negative cover lift.

Annular ledge 34, (FIG. 2d) extending inwardly from the upper edge of drum 22, supports a transparent base plate 36. The photographic negative 38, emulsion side up, rests on base plate 36 and is held against unwanted displacement from the required position by cover plate 40. As is evident, cover plate 40 and base plate 36 sandwich the photographic negative between them, to guard against any movement when the device is in operation. The negative is slid between the two glass discs for insertion and removal when glass cover 40 is lifted by cover lift 42 (see FIG. 2d). As shown in FIG. 4, cover lift 42 consists of a lift slide 44, lever 46, removable plate or gib 48 and cover lift roller 50. Thus, movement of cover lift 42 raises plate cover 40 for access to negative 38.

Figure 3:
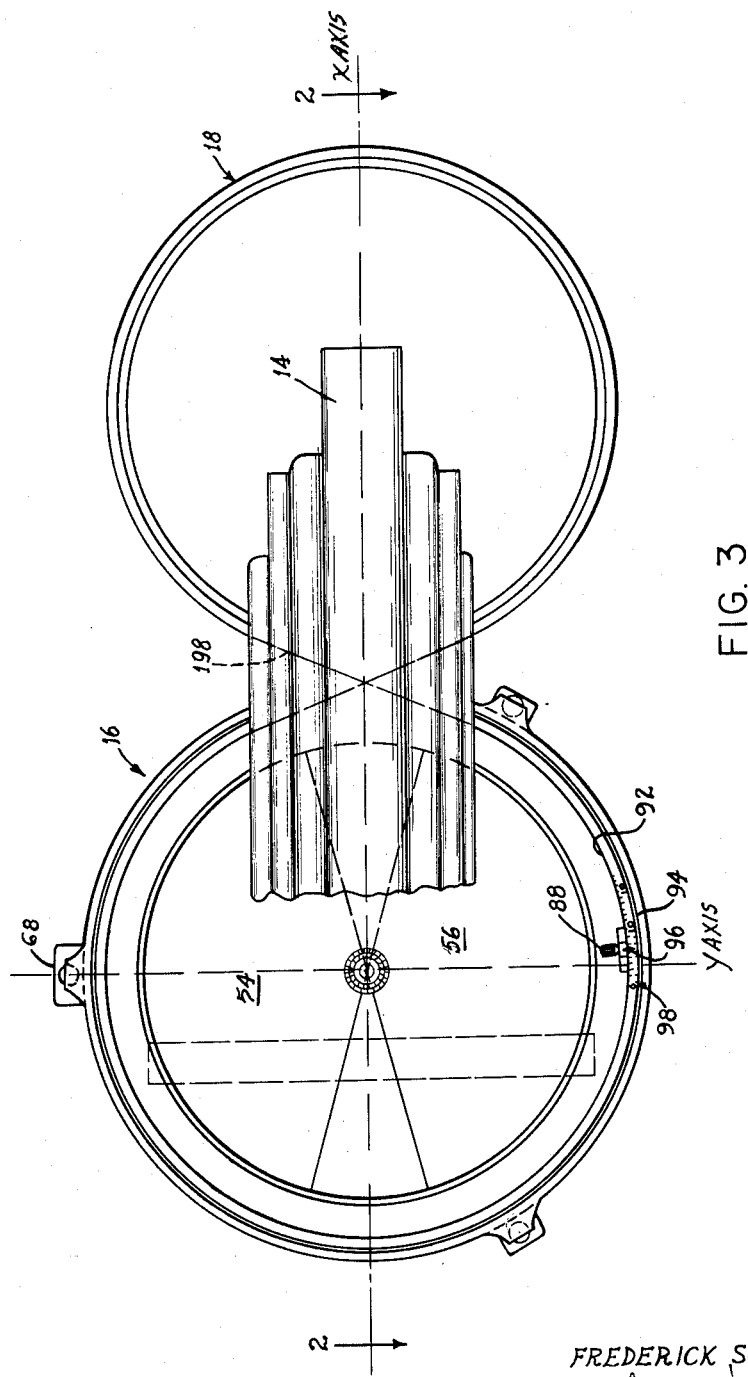
FIG. 3 is a plan view of the turntables and is taken substantially on line 3—3 of FIG. 2.

Mounted above negative plate 38, in closely spaced relation is the angular shutter mask 52, used to control exposure time for the negative. Shutter mask 52 is shown in part in FIGS. 2a and 2c. The mask is formed by two semi-circular discs or shutter blades 54 and 56 (FIG. 3) retained within annular groove 58 formed on inner periphery of the movable shutter ring 60 (FIG. 2c). The shutter blades form a V-opening with the apex at the center of drum 16 (FIG. 1) as shown in FIG. 2c, the masking blades are clamped into groove 58 at 62. Shutter adapter 64 is secured on shutter mount 66, held on the projector by means of spaced brackets 68 (FIG. 3). Shutter roller 70, rotatably supported on a stem 72 fixed on bracket 74, rides in annular slot 76. Slot 76 is formed on the outer periphery of ring 60. Shutter adapter ring 78 is secured on retainer 80 and in turn secures adapter 64. Retainer 80 is fastened at 82 to shutter mount 66. Index 84 is secured to ring 78 (FIG. 2c). Below the negative discs is a small lamp (not shown), with provision for suitable safelight for use in general overall negative illumination. It is used only in inspecting a negative prior to projecting it. The V-mask formed by the shutter disc plates may be opened up to expose one-half of the entire negative for this purpose.

Shutter blade 54 is fixedly clamped at 62 and does not rotate. Shutter blade 56 is secured to movable ring 60. Knob 88 is fastened to ring 60 and is threaded through bearing 90 on index 84 and into engagement with the side of ring 64. Rotation of knob 88 into engagement with ring 60 sets ring 60 into fixed relation with shutter adapter 64. Two sets of indicia are etched onto adapter ring 64. As shown on FIG. 3, indicia 92 coordinates with the index on knob bearing 90, while indicia 94 coordinates with the index on adapter ring 78 (FIG. 2c).

Negative 38, held between transparent plates 36 and 40, is beneath shutter blades 54 and 56 (FIG. 3). Blades 54 and 56 comprise the angular mask which controls exposure time. To select the required angle for exposure of the negative below, inner ring 60 (FIG. 2c) is rotated until index pointer 96 (FIG. 3) points to the required angle on scale 92. Since the edges of the V-opening formed are tangent to the circle, the outer end of the V-slot rotates much more rapidly than the apex of the slot. As a result, the exposure time is maintained uniform during the scanning period of optical unit 14. Also, the center of objective lens is at the bisector of the V-angle. To obtain this, rings 60 and 64 are turned together so that the same angle on the outer scale 94 is opposite its index 98. The V-opening is now symmetrical with the line of the centers of rotating shutter blades 54 and 56. Knob 88 (FIG. 3) is operated to retain the desired exposure opening in fixed position.

As seen on FIG. 2g, easel disc 18 includes an easel top 99 mounted for rotation on a heavy axle 100, supported on thrust and radial ball bearings 102. Removably mounted on top of easel member 99 is a relief or terrain model map 104 which bears relief according to a particular surface area of the earth. The negative 38 which is mounted on the base plate 36 of negative carrier 16 (FIG. 1), is usually an aerial photograph of the same surface area and to the same scale as the terrain model map 104. Base plate 36 and easel top 99 lie in the same plane and are simultaneously rotated, although in opposite direction, as will presently be explained.

Easel center plate 105 (FIG. 2g) is mounted on easel circle 106 by means of cleats 108 and easel circle 106 is secured on turntable 110 by cross-bar 112. Fastening screws 114 secure easel top 99 and center plate 105 together. Screws 115 fasten plate 105 and easel circle 106 together. Thus, easel disc turntable 18 rotates as a unit, when the otho-projector is in operation.

It is necessary that easel turntable 18 be centered so that the objective assembly overlies the center of the easel top 99 to align the negative and the terrain model. Also, centering of the easel assembly 18 prevents undue strain on axle 100. An apertured bearing 116 (FIG. 2f), threaded interiorly and depending from easel top 99 is adapted to receive the threaded stem 118 of screw 120. Bracket 121, secured to center plate 105 at 122, is apertured at 124 in axial alignment with aperture 126 of bearing 116, stem 118 extending through these apertures. Spring housing 128 (FIG. 2g) extends through aperture 130 in flange 132, on the outer periphery of center plate 105 and retains hollow spring plunger 134 therein. A tension spring 136 (FIG. 2g) is seated between plunger 134 and head 137 on housing 128, urging plunger 134 into constant engagement with a stud 138 depending from table top 99. Plug 140 is retained in stud 138 and abuts plunger 134.

To center easel disc assembly 18, adjusting screws 120 (FIG. 2f) are rotated. Two such screws 120, set 90 degrees apart, are mounted on center plate 105. Tension spring plungers 134 (FIG. 2g) are mounted in opposed relation to adjusting members 120 and serve to prevent play in the device. Actuation of one adjusting screw 120 will move easel top 99 along the X-axis (i.e., along line 2—2 of FIG. 3), while actuation of the second adjustment screw 120 located 90 degrees away, will move easel top 99 along the Y-axis (i.e., perpendicular to line 2—2 of FIG. 3). To carry out this function, slots 142 in disc 105 (FIG. 2g) permit connecting means 114 a limited range of movement.

Figure 5:
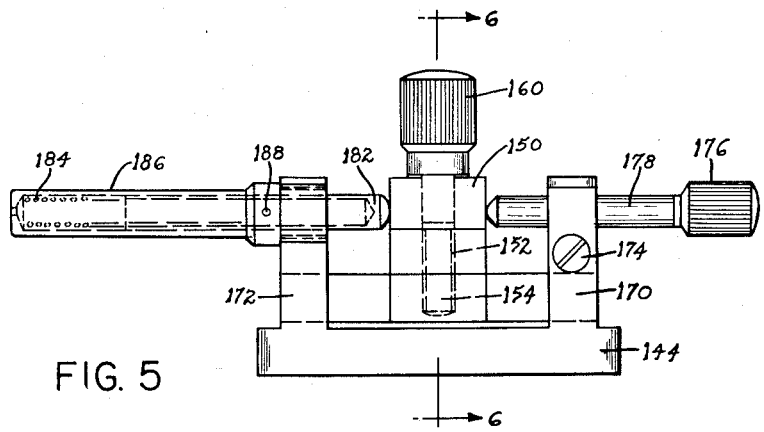
FIG. 5 is an enlarged detail of the circle clamp assembly of FIG. 2.
Figure 6:
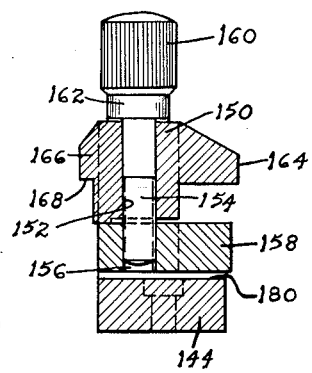
FIG. 6 is a section taken on line 6—6 of FIG. 5.

It is also necessary to rotatably adjust the position of terrain model 104 which is retained on easel top 99. Circle clamp bracket 144 (FIG. 5) is secured to turntable 110 at 146 in housing 148 (FIG. 2f), provided at the peripheral edge thereof. Circle clamp 150 (FIG. 5) is axially bored at 152 and receives therein screw stem 154 (FIG. 6). Stem 154 extends through bore 152 and into an aligned bore 156 in clamp jaws 158. Rotation of knurled head 160 on stem 154 causes shoulder 162 to urge clamp 150 towards clamp jaw 158 (FIG. 6). Clamp 150 contains an extended flange 164, adapted to lie in spaced parallel relation to clamp jaw 158, as well as a short lip extension 166, diametrically opposed to flange 164. It should be noted that shoulder 168 does not lie in the same plane as flange 164. Thus, when clamping screw 160 is tightened on clamp jaw 158, easel circle 106 is securely held in position, while lip 166 is slightly spaced from the upper edge of turntable 110 (FIG. 2f). Adjustment of table 105 is capable of being carried out.

Clamp bracket 144 (FIG. 5) is elongate in form and includes a pair of vertical posts 170 and 172. Post 170 is vertically split and is urged into closed position by means of clamp screw 174 extending therethrough. Circle adjustment screw 176, having a threaded shank 178, extends between the split posts 170 and adjustably engages circle clamp 150. Rotation of screw 176 causes circle clamp 150 to move. Since clamp 150 retains the peripheral edge of easel circle 106 between jaws 164 and 158 (FIGS. 6 and 2f), easel circle 106 rotates in a horizontal plane. The slight spacing maintained at 180 between clamp bracket 144 and clamp jaw 158 prevents binding. Clamp 150 is constantly urged against screw 176 by plunger 182, resiliently held against clamp 150 by spring 184, seated in circle spring housing 186 (FIG. 5). Housing 186 extends through a suitable aperture in post 172 and is maintained in fixed position by set screw 188. In this manner, plunger 182 exerts a constant force against clamp 150 and when screw 176 is withdrawn, plunger 182 causes clamp 150 to move counter-clockwise. Concentric slot 190 (FIG. 2f), through which screws 115 extend, is wide enough to allow easel 106 to rotate through the required angle of adjustment.

Plunger 182 (FIG. 5) also functions to prevent any undesired movement of the easel disc. Depending flanges 192 on center plate 105, cooperating with vertical flanges 194 on easel circle 106 (FIG. 2g) also prevent undesirable play of the easel disc.

Negative carrier 16 and easel terrain disc 18 (FIG. 1) are rotated simultaneously. Two steel cables 196 are both fastened to the two discs and wrapped around them a number of times. Easel disc 18 drives the negative carrier and one cable unwinds from the easel disc as the other cable winds on it. Thus, negative carrier 16 is rotated in a direction opposite to, but at the same speed as easel disc 18. No slippage of cables 196 is possible, since they are fastened to both discs.

The power to rotate the discs is furnished through a variable speed transmission system 198 (see FIGS. 2h, 2i, 2j and 2k). Drive shaft 100 is fixed to the bottom of easel disc 18 and is connected to motor 200 by means of a pair of bevel gears 202, shaft 204, gear reduction 206, and to variable speed transmission 198. In this manner, easel 18 and cable attached negative carrier 16 are rotated by motor 200. Optical system 14 and its attendant platform are driven laterally across the carrier and easel by motor 200 through threaded lug 208 (FIG. 2b), lead screw 210, bevel gears 212 (FIG. 2a), shaft 214 (FIG. 2h), bevel gears 216, shaft 218 and variable speed transmission 198. Since threaded lug 208 is attached to the movable platform 29 (FIG. 2b), the rotatably driven lead screw 210, rotating in lug 208, will move the platform and optical system laterally back and forth along a portion of the center line of carrier 16 and easel disc 18.

The controls for the variable speed transmission, located on a panel above box 220 (FIGS. 2i and 2j), and the connections between the transmission, easel and platform are such that when the negative carrier and the easel disc are driven at a preselected speed of rotation, the platform with its optical system will be advanced in a linear direction along the line of centers of carrier 16 and easel disc 18 at a speed proportional to the rotational speed of the easel and carrier.

Optical system 14 comprises a lower lens system 222 (FIG. 2e) and an upper lens system 224 (FIG. 2b) connected by vertical lamp support housing 226 (FIG. 2a). Optical system 14 is supported on table 12 by cradle assembly 228 (FIG. 7) with cradle tracks 230 and 232 having lateral flanges 234 secured at 237 to cradle 228. Track 230 is provided with an upper inverted V-shaped edge 236 on which ride opposed rollers 238 attached at 240 to the extensions 242 on the U-shaped cradle 244. Rollers 246 are secured to cradle 244 at 248 and ride directly on the upper edge of track 232. By this construction, undesired play of the optical system is prevented.

Lead screw 210 (FIG. 9) is supported in bearings 250 and 252, and is coupled to cradle 244 (FIG. 7) by means of bearing 254 (FIG. 9) apertured at 256 to receive nut 210 therethrough. Cupped seat 258, extending above bearing 254, receives the rounded end 260 of locking stem 262 to lock screw 210 and cradle 244 together for simultaneous movement. Locking stem 262 is fastened to extension 242 at 264 and extends through a suitable slot 266 to seat in cupped member 258. A stationary semicircular sleeve projection 268 extends upwardly from member 264 around stem 262. A second semicircular sleeve projection 270 depends from knurled head 272 on stem 262. Since stem 262 is freely rotated, it is raised from seat 258 and is rotated to seat on the upper edge of sleeve member 264. This disconnects traveling nut 210 from cradle 244 so that the optical system and the negative carrier and easel disc can be moved independently of each other. These movements aid in adjusting the equipment and registering the negative and terrain model. Rotation of stem 262 until the semi-circular sleeves are in opposed positions, allows stem 262 to drop into seat 258 and to lock the optical system and traveling nut 210 together. Cradle 244, with the attendant optical system 14, is positioned for movement along the line of centers of negative carrier 16 and easel 18 so that the optical axis of the optical system moves uniformly over both a radius of the negative and a corresponding radius of the terrain map. Operation of the device rotates lead screw 210 by means of shaft 214 (FIG. 2h). Shaft 214 is connected to transmission 198 and includes universal means 274 and bevel gear 276, cooperating with gear 212 on lead screw 210. Rotation of lead screw 210 moves the upper and lower optical lenses linearlry in unison.

Lower lens system 222 (FIG. 2d) consists of a tubular housing with an extension 278 secured to the bottom of lamp housing 226. Lamp adapter 240 depends from extension 278 and supports lamp socket bushing 282 for lamp 284 thereon. Collective or condenser lens 286 is retained in lens housing 222 by means of shoulder 288 and ring 290 and is in spaced relation from a diaphragm 292 (FIG. 2e) mounted in housing 226 and held in position by retainer 294 and adapter 296. Lens 286 brings the light rays from lamp 284 to a focus at aperture stop 298, which acts as a point source of illumination. Stop 298 is located at the focal point of collimating lens 300 so that rays emerging from stop 298 will be reflected by first surface plane mirror 302, secured at a 45° angle in housing 222, into lens 300 and will emerge therefrom as parallel rays. Thus stop 298 becomes the effective light source for the optical system. As is apparent, the size of aperture 298 may be changed by adjusting means 304, and the aperture is centered exactly by five adjustment screws 306.

A safe light filter housing 308 (FIG. 2d) extending through lens system 222 at a point adjacent the light source supports a light filter 310 rotatably on stem 312 and is controlled by lever 314 in operative position, or by means of a 90° rotation, into inoperative position. Filter 310 is red and is used when making adjustments in registration.

Lamp 284 is aligned with lower lens system 222 and is mounted in socket 282, extending into housing 226. Light shield means 316 (FIG. 2a) are provided and lamp housing 226 is secured at its upper ends 318 to flanges 242 on U-shaped cradle 244 (FIG. 7).

Upper lens system 224 overlies the negative carrier 16 and terrain disc 18. Objective tube 320 (FIG. 2b) is mounted in a housing 322 which is supported on brackets 324 extending from base plate 326. Base plate 326 is fastened to U-shaped cradle 244 and includes an extension beyond the end of U-shaped cradle 244 (FIG. 7). Opening 328 in the extension on base plate 326 admits the parallel rays reflected through collimating lens 300 (FIG. 2e) for reflection by objective mirror 330 (FIG. 2c) held by cleats 332 at a 45 degree angle on mirror mount 334 secured to base 336 on plate 326. Mirror 330 is in optical alignment with collimating lens 300. Elongated slot 338 on base 336 receives screw 340 therein. Slight lateral adjustment is permitted by means of the elongate slot, while set screw 342, extending through mount 334, and seating in detent recess 344, permits rotational adjustment of mirror 330.

Objective mirror 330 (FIG. 2b) overlies the easel disc terrain model 104, while a second objective mirror 346, similarly mounted at 335 to base plate 326, overlies negative film 38 (FIG. 2f). Mirrors 330 and 346 are spaced apart a distance equal to the distance between the centers of the negative carrier and easel terrain disc. Erecting lenses 348 (FIG. 2c) and 350 (FIG. 2b) are mounted in objective mounts 352, adjustably retained in objective tube 320, lenses 348 and 350 being in optical alignment. Platform base 326 with optical system 14, is positioned for movement along the line of centers of negative drum carrier 16 and easel disc 18 so that the optical axis of the optical system moves uniformly over both a radius of the negative and a corresponding radius of the terrain map.

The collective lens 286 (FIG. 2d) brings the light rays from source 284 to a focus at stop 298 (FIG. 2e) which acts as a point source of illumination. Stop 298 is located at the focal point of collimating lens 300 so that rays emerging from the stop will be reflected by the first source plane mirror 302 into lens 300 and emerge as parallel rays. These rays are reflected by mirror 330 (FIG. 2c) in the upper lens assembly into erecting lens 350 and brought to a focus at the front focal point 354 of lens 350. The second erecting lens 248 is in optical alignment with lens 350 and is so spaced therefrom that the focal point also lies at 354. Therefore, rays from point 354 passing through lens 348 are rendered parallel by lens 348 and are reflected by first surface mirror 330 onto the uneven terrain map 104. This construction insures great depth of focus and image forming without parallactic distortion.

Negative 38 lies in the common focal plane of lenses 300 and 350, so that when data on negative 38 is illuminated by parallel rays from lens 300, each point on the negative emits a small bundle of rays which pass as a parallel bundle from lens 350 to 348, lens 348 focusing the bundle of rays at a point in its focal plane. The focal plane of lens 348 substantially coincides with terrain map 104. In this manner, by suitable adjustment, the projected image remains stationary relative to easel terrain disc 18 to produce sharp infocus results, since both the axis of the first erecting lens projected on the negative carrier is exactly the same distance from the axis of rotation of the negative as the axis of the second erecting lens, projected on the easel is from the axis of rotation of the easel disc and these two axes lie in a plane perpendicular to the surface of the negatives and easel and containing their line of centers.

The image of the light source is at a 1× magnification in diaphragm 292 which is the source of the projection system (see FIG. 1). The stop is at the focal point of collimating lens 300. The image of the negative is at 1× magnification on the terrain model by the erecting lenses. Lens 350 forms an image of the negative at infinity. Lens 348 focuses this image on the easel disc. See FIGS. 2b and 2c.

A mask mounting sleeve 356, having an annular lip 358 is secured at 360 to base plate 326 at a point adjacent opening 328 which overlies the negative carrier. Pressure plate 362 is positioned in clip 358 and is actuated by adjusting screw 364. Mask tube 366, open at opposed ends, is secured by ring 368 at 370 to sleeve 356. In turn, mask adapter 372 is fastened at 374 to the lower open end of tube 366, shoulder 376 serving as a convenient stop. Mask blade 378 (FIG. 2b) is fixed at 380 to the lower edge of adapter 372. Mask blade 378 is a rectangular bar and is tangentially disposed with its major axis perpendicular to the line of centers of carrier 16 and easel disc 18. Blade 378 is stationary, while a second blade 382, disposed diametrically opposite blade 378 is adjustably mounted in bracket 384. Adjusting screw 386 extends through bracket 384 and is held in place by adjusting nut 388. Tension means 390 is mounted around screw 386. Mask adapter 372 just clears the angular mask, or semicircular discs 54, 56. The two sides which are tangent to the swept path prevent overlap and underlap in scanning. The adjustable construction for blade 382 permits opening 392 in mask 372 to be made larger or smaller. Overlap is evident by a spiral dark line and underlap shows a spiral bright line on terrain model 104. To adjust either type, clamp screw 386 is loosened, and nut 388 is turned clockwise to remove underlap and counter-clockwise to remove overlap. Mask 372 is centered at the rotation of negative 38 by means of screws 374 (FIG. 2b).

Mask 372 defines the image field in radial direction. The V-shaped slot formed by semi-circular discs 54 and 56, is variable in width to insure that an equal exposure time will be given to the negative at its periphery, as at its center. Tangential mask 372 is disposed perpendicularly to the bisector of the V-slot and extends across the V-slot. Since a point on the negative near the center of the drum will travel a less distance in a given period of time, then a corresponding point near the periphery of the drum, less distance of exposure travel is needed near the center of carrier 16. This less exposure travel in the same exposure time is accomplished by the V-shaped slot, since near the apex of the V-slot a point takes the same time to travel from one wall of the V to the other as a corresponding point near the periphery of the V takes to travel from one wall of the V to the other. Therefore, the linear movement of the optical system and tangential mask 372 perpendicularly across the rotational movement of the drum an V-shaped slot sets up a spiral scanning of the negative on the drum such that every point on the negative is equally exposed. Since terrain model 104 rotates with negative 38 (FIG. 1) and they are positioned under the projection end of the optical system, the data from the negative is projected onto the relief map, every point on the relief map being equally exposed to the rays of the optical system 14.

The negative is scanned by placing it emulsion side up on glass disc 36 rotating about its center. The terrain model is placed on easel 18 which also rotates about its center but in an opposite direction. Optical system 14 is translated along the line of centers of the two discs so that the optical axis of the optical system moves uniformly over half the diameter of the negative. The image of the negative is erect along the line of centers but is inverted in the other meridian. The two discs move in opposite directions so that relative to the terrain model, the image of the negative is always stationary. Close to the negative is a V-shaped angular mask symmetrical to the line of centers of the discs. The apex of the V is at the center of rotation of the negative disc. The angle of the V, together with the speed of rotation, controls the exposure of the print. The exposure E in seconds for any unit of area is given by the expression:

$$E = \frac{\alpha}{6R}$$

where $\alpha$ is the angle in degrees of the V, and R is the number of revolutions per minute of the discs. An additional mask 372, with approximately tangential blades 378 is located close to the angular mask. The width of this opening 392 is approximately equal to the pitch of lead screw 210 which moves optical system 14 in a radial direction. This removes the possibility of overlap or underlap which would cause a spiral dark or bright line on the print.

Since all points on the negative register with the corresponding points on the photosensitized terrain models, when the parallel light rays are transmitted up through negative 38, and are projected by optical system 14 in parallel rays down on the terrain model or relief map 104, on easel disc 18, the data from the negative will be properly printed on the corresponding relief on the terrain map.

The motor, acting through the transmission, will rotate the drum and easel and at the same time will slowly move the optical system along the radii of the drum and easel. A spiral scanning of the negative and spiral projection onto the terrain model will result whereby the data from the negative will be transposed onto the photo-sensitized terrain model.

After the optical system has completely scanned the negative, the terrain model will be removed and developed with the usual photographic methods to provide a terrain map with appropriately and properly registered surface data printed thereon.

Obviously many modifications and variations of the present invention are possible in the light of the above teachings. It is therefore to be understood that within the scope of the appended claims the invention may be practiced otherwise than as specifically described.

I claim:

1. A projector for transferring two-dimensional information onto three-dimensional models comprising first means to support a two-dimensional terrain negative, second means in the same plane as said first means to support a three-dimensional model, means connecting said first two means for synchronous rotation in opposite directions and an optical system spaced from said first two means to project the image from the negative on to the three-dimensional model, wherein said first and second means comprise turntables and said connecting means comprises cables wound around said turntables for simultaneous rotation.

2. An orthoprojector for transferring two dimensional map information onto three dimensional terrain models comprising a negative turntable, a terrain model turntable coplanar wtih said negative turntable, means operatively connected with said turntables to synchronously rotate them in opposite directions, a negative mask adjustably secured on said negative turntable and adapted to overlie a negative, and an optical system spaced from said turntables to project the image from a negative on to the terrain model.

3. An orthoprojector for transferring two dimensional map information onto three dimensional terrain models comprising a negative turntable, a terrain model turntable coplanar with said negative turntable, means operatively connected with said turntables to synchronously rotate them in opposite directions, a negative mask adjustably secured on said negative turntable and adapted to overlie a negative, and an optical system spaced from said turntables to project the image from a negative on to the terrain model, said negative mask comprising a pair of semicircular discs, and an annular groove in said negative turntable receiving said discs.

4. An orthoprojector for transferring two dimensional map information onto three dimensional terrain models comprising a negative turntable, a terrain model turntable coplanar with said negative turntable, means operatively connected with said turntables to synchronously rotate them in opposite directions, a negative mask adjustably secured on said negative turntable and adapted to overlie a negative, and an optical system spaced from said turntables to project the image from a negative on to the terrain model, said negative turntable including a base plate and a cover plate, said base plate retaining a negative thereon.

5. An orthoprojector for transferring two dimensional map information onto three dimensional terrain models comprising a negative turntable, a terrain model turntable coplanar with said negative turntable, means operatively connected with said turntables to synchronously rotate them in opposite directions, a negative mask adjustably secured on said negative turntable and adapted to overlie a negative, and an optical system spaced from said turntables to project the image from a negative on to the terrain model, said negative turntable including a base plate and a cover plate, said base plate retaining a negative thereon, said negative mask comprising a pair of semicircular discs, and an annular groove in said negative turntable receiving said discs.

6. An orthoprojector for transferring two dimensional map information onto three dimensional terrain models comprising a negative turntable, a terrain model turntable coplanar with said negative turntable, means operatively connected with said turntables to synchronously rotate them in opposite directions, a negative mask adjustably secured on said negative turntable and adapted to overlie a negative, and an optical system spaced from said turntables to project the image from a negative on to the terrain model, said rotating means comprising cables secured to said turntables, a drive shaft depending from said terrain turntable, a horizontal shaft operatively engaging said drive shaft, variable speed transmission means secured to said horizontal shaft, and a vertical shaft connecting said transmission means and optical system whereby said turntables are rotated synchronously and said optical system is advanced linearly.

7. An orthoprojector for transferring two dimensional map information onto three dimensional terrain models comprising a negative turntable, a terrain model turntable coplanar with said negative turntable, means operatively connected with said turntables to synchronously rotate them in opposite directions, a negative mask adjustably secured on said negative turntable and adapted to overlie a negative, and an optical system spaced from said turntables to project the image from a negative on to the terrain model, said optical system including a lower lens system mounted beneath said turntables, an upper lens system mounted above said turntables and an advancing screw secured to said upper lens system to move the optical system linearly.

8. An orthoprojector for transferring two dimensional map information onto three dimensional terrain models comprising a negative turntable, a terrain model turntable coplanar with said negative turntable, means operatively connected with said turntables to synchronously rotate them in opposite directions, a negative mask adjustably secured on said negative turntable and adapted to overlie a negative, and an optical system spaced from said turntables to project the image from a negative on to the terrain model, said optical system including a lower lens system mounted beneath said turntables, an upper lens system mounted above said turntables and an advancing screw secured to said upper lens system to move the optical system linearly, said lower lens system comprising a housing, a collective lens mounted in said housing, a first surface mirror and a lens mounted in said housing in spaced relation to said collective lens and a point source of illumination mounted in front of said lower lens system whereby parallel rays from said lower lens system are transmitted to said upper lens system.

References Cited in the file of this patent

UNITED STATES PATENTS

| | | |
|---|---|---|
| 2,309,752 | Cooke | Feb. 2, 1943 |
| 2,464,793 | Cooke | Mar. 22, 1949 |
| 2,552,990 | McKay | May 15, 1951 |
| 2,830,491 | Domeshek | Apr. 15, 1958 |